United States Patent [19]

Sakai

[11] Patent Number: 4,933,201

[45] Date of Patent: Jun. 12, 1990

[54] DURABLE ODORLESS GARLIC AND A METHOD OF MANUFACTURING THE SAME

[76] Inventor: Isao Sakai, No. 2-11, 1-chome, Nishiogi-minami, Suginami-ku, Tokyo, Japan

[21] Appl. No.: 281,654

[22] Filed: Dec. 9, 1988

[30] Foreign Application Priority Data

Apr. 22, 1988 [JP] Japan .................... 63-99722

[51] Int. Cl.⁵ .................... A23C 1/211; A23C 1/015
[52] U.S. Cl. .................... 426/638; 426/425; 426/443; 426/455
[58] Field of Search ............ 426/425, 443, 455, 456, 426/638; 210/640

[56] References Cited

U.S. PATENT DOCUMENTS 3,950,892  4/1976  Simkin .................... 426/385
4,377,600  3/1983  Morinaga .................... 426/650
4,741,914  5/1988  Kimizuka et al. .................... 426/638

FOREIGN PATENT DOCUMENTS 57-29265   2/1982  Japan .
60-259157 12/1985  Japan .

*Primary Examiner*—Donald E. Czaja
*Assistant Examiner*—D. Workman
*Attorney, Agent, or Firm*—Martin Smolowitz

[57] ABSTRACT

A method of manufacturing durable odorless garlic comprising the steps of deodorizing bulbs of raw garlic by immersing them in a deodorizing solution containing at least one of mesoinositol hexaphosphate and silicic acid sol, and then drying the bulbs of raw garlic until the water content thereof is reduced to 50–65% by weight. The thus treated garlic bulbs can be stored for a long time with no deterioration and putrefaction and without losing germinability.

8 Claims, No Drawings

DURABLE ODORLESS GARLIC AND A METHOD OF MANUFACTURING THE SAME

BACKGROUND OF THE INVENTION

1. Field of the Invention

The present invention relates to durable odorless garlic and a method of manufacturing the same and, more particularly, to a method for making odorless garlic and its products having excellent durability, which is less germinative although it is a raw garlic having germinating performance and which can be stored neither with withering nor rotting even for several months.

2. Description of the Prior Art

Heretofore, garlic bulbs have been preserved with skins while being suspended in airy place. However, if they are left for several months, the moisture at the surface portion thereof is dried up to bring about withering, or they tend to become rotten or to germinate. Also, in case they are packed in large package and stacked in a warehouse, those placed in lower layers are rotten at the portion of contact with other bulbs or they germinate in early spring. In order to avoid these problems, garlic bulbs have been preserved in the warehouse under temperature control.

Furthermore, a method of killing peculiar odor inherent to garlic has been proposed and disclosed in, for example, Japanese Patent Laid-Open Sho 60-259157.

It is desirable to preserve garlic, even such odorless one as has been described above, in the raw state. Preservation of the odorless raw garlic may be possible also in a temperature controlled warehouse, but it is difficult for retail stores of ordinary scale to additionally install such a temperature control facility for garlic in view of the cost. If deodorized garlic which is more expensive should be rotten, it causes considerable damages. On the other hand, if garlic is completely dried, flavor, vitamin contents etc. that the raw garlic possesses are deteriorated.

SUMMARY OF THE INVENTION

In view of the foregoing problems, it is an object of the present invention to provide a method of manufacturing odorless garlic which is raw and excellent in storage stability while being germinative.

Another object of the invention is to provide deodorized raw garlic having a sufficient durability but still germinative.

The foregoing objects of the present invention can be attained by a manufacturing method of durable odorless garlic, which comprises the steps of applying a deodorizing treatment by immersing bulbs of raw garlic in a deodorizing solution containing mesoinositol hexaphosphate and/or silicic acid sol, taking out the bulbs of raw garlic from the deodorizing solution, dehydrating them at a temperature lower than 40° C. and then drying them so that the water content therein is reduced to 50-65 % by weight.

It has been found that mercaptan attributable for malodor of garlic is generated when alliin, which is a protein (amino acid) of garlic, is enzymatically decomposed into aricine. Since the mesoinositol hexaphosphate has an enzymatic effect of coagulating the decomposing enzyme (protein) contained in garlic, formation of mercaptan can be prevented.

The silicic acid sol has an effect of adsorbing sulfides contained in garlic bulbs, thereby suppressing the generation of mercaptan.

Accordingly, each of mesoinositol hexaphosphate and silicic acid sol has an effect of removing malodor of garlic alon and, when used in combination, they exhibit a synergistic effect.

While unprocessed, natural bulbs of raw garlic contain from 70 to 80 % by weight of water, the garlic bulbs immersed in a deodorizing solution contain more than 90 % of water. The bulbs of raw garlic taken out from the deodorizing solution could be dehydrated in a shorter period of time when they are dried at a high temperature. However, since the tissue of the bulbs of raw garlic is destructed under a high temperature, a temperature lower than usual body temperature is preferred. Furthermore, under the temperature from 30° to 40° C., volatile odoring gases in the bulbs of garlic evaporate.

When the bulbs of raw garlic are dried to contain 50-65 % by weight of water, which is lower by 20-30 % than the usual content in the bulbs, germination of the garlic bulbs is suppressed. Furthermore, since the bulb bodies are shrinked to harden, evaporation of the water is suppressed. The hardened bodies having less water content prevent the garlic bulbs from being easily damaged and reduce propagation of rot-causing bacteria, resulting in an improved storability for a long period of time.

EXAMPLES

The present invention will be described in more detail by way of its examples.

Example 1

A deodorizing solution was prepared by dissolving 20 g of mesoinositol hexaphosphate into 20 kg of water. While maintaining the deodorizing solution at 35° C., 10 kg of bulbs of raw garlic with skins were immersed in the solution and kept therein for two days. Thereafter, the temperature of the deodorizing solution was lowered to 25° C. and then the solution temperature was lowered by 5° C. per one day. The bulbs of garlic were finally taken out from the solution in 5 days after immersion. At that time, the water content of the garlic bulbs was as high as 92 % by weight.

The water content in the deodorized garlic bulbs was reduced to 65 % by weight by enhousing them in a pressurereduction chamber and reducing the pressure in the chamber down to 150 millibar. The thus dehydrated bulbs of raw garlic were placed in a drying chamber which was kept at 35° C. by farinfrared rays, and were maintained therein for 3 hours so that the water content of the garlic bulbs was reduced to 55 % by weight.

Ethanol may be added occasionally by 10 to 100 g to the above deodorizing solution for improving the solubility of the mesoinositol hexaphosphate. A preferred amount of the mesoinositol hexaphosphate is from 2 g to 100 g for 20 kg of water.

The temperature lowering of the deodorizing solution was made in order to promote the osmosis of the deodorizing solution into the garlic bulbs. That is, an osmotic pressure generally is substantially in proportion with an absolute temperature. When the temperature of the deodorizing solution in which the garlic bulbs are immersed is lowered from 35° C. to 25° C., a temperature difference occurs between the deodorizing solution and the garlic bulbs and continues until the latter temperature becomes 25° C. This difference in temperature causes a negative pressure on the side of the garlic bulbs and increases the osmotic pressure of the deodorizing solution, resulting in a sufficient osmosis of the deodorizing solution into the garlic bulbs. The temperature of the solution may be lowered either stepwise as above or gradually. As a result, the osmosis can be promoted by more than 30 % as compared with the case wherein the bulbs are immersed in the solution held at a constant temperature, making it possible to increase the deodorizing effect and shorten the processing time. Although higher temperature of the solution would be better for promotion of the osmosis, the tissue, flavor, vitamine content etc. of the raw garlic bulbs tend to be impaired if the temperature exceeds 40° C. Therefore, a preferred temperature of the solution is in a range from 15° C. to 40° C.

If the raw garlic bulbs are dried under heating, they are dehydrated at the surface portions and are withered to reduce their commercial value. On the other hand, in case of dehydrate under a reduced pressure, the negative pressure formed at the outside of the garlic bulbs serves to maintain the entire configuration of the garlic bulbs after the water exudes therefrom, with rendering the dehydrated bulbs porous. Thus, the commercial value is not deteriorated. Further, the reduced pressure contributes to shortening the time required for hydration. A room pressure is generally about 760 millibar. When the pressure is reduced to 60 millibar, the water in the raw garlic bulbs boils under the temperature of 42° C. The boiling evaporates water in the garlic bulbs to boil the bulbs themselves. Thus, it is preferable to keep the temperature less than 40° C. and the pressure more than 100 millibar so that the garlic bulbs may be dehydrated while being raw. For effective dehydrate without destroying the cells of raw garlic bulbs, it is preferable to keep the pressure in the range from 100 to 300 millibar when the room temperature is 20° C.

Regarding the temperature in the drying chamber, although higher temperature could provide sooner drying, a temperature lower than the body temperature is preferable for avoiding the destruction of cells in the raw garlic bulbs, and a preferred temperature is from 30° to 40° C. in view of the drying efficiency. While any heat sources may be utilized, the water content can be uniformed throughout the bulbs by using farinfrared rays.

The water content in the garlic bulbs is preferably reduced by from 20 to 30 % based on the water content of from 70 to 80 % by weight in the natural raw garlic bulbs. That is, when the bulbs are dried to the water content of 50 to 65 % by weight, they become less germinative. Furthermore, since the bulb body is tightened and its surface is hardened, they are tough against physical damages, suppress the propagation of rot-causing bacteria if deposited and result in less withering at the surface because water therein is less evaporizable. All these factors contribute to improve the durability and storability.

Ten samples of the durable odorless garlic were thus obtained. Upon conducting analysis, the results as shown in Table 1 were obtained which confirm that malodor was decreased. In addition, when they were stored at a temperature of 15° C., they scarcely showed change even after the lapse of one year and six months. Also, germination test was conducted by giving water to the samples in a room maintained at 27° C., resulting in a finding that all of 10 bulbs were germinated.

Substantially the same effect can also be obtained by using inositol hexaphosphate as deodorant instead of mesoinositol hexaphosphate in this example.

Example 2

A deodorizing solution was prepared by dissolving 30 g of silicic acid sol into 20 kg of water and was maintained at a temperature of 40° C., in which 10 kg of raw garlic bulbs with skins were immersed. After the lapse of one day, the temperature of deodorizing solution was lowered by 10° C. per one day, and the garlic bulbs were taken out in five days counting from the immersion. The raw garlic bulbs were thus placed in a pressure-reduction chamber maintained at a temperature of 25° C. and at a pressure of 250 millibar for dehydration. After two hours, the pressure was increased to normal atmospheric pressure and the temperature to 35° C. for drying the bulbs such that the water content thereof was reduced to 53 % by weight.

Several samples of durable odorless garlic were thus obtained. Upon conducting the analysis, the results as shown in Table 1 were obtained to confirm that the malodor was decreased. In addition, after they were stored for one year at a room temperature of 20° C., they scarcely showed changes and were germinated when water was given.

Example 3

A deodorizing solution was prepared by dissolving 20 g of mesoinositol hexaphosphate and 20 g of silicic acid sol into 20 kg of water and was maintained at a temperature of 35° C., in which 10 kg of garlic bulbs with skins were immersed. After two days, the temperature of the solution was allowed to spontaneously lower. Finally, the garlic bulbs were taken out from the solution after four days. Then the raw garlic bulbs were dehydrated in a pressure-reduction chamber maintained at a room temperature of 20° C. and a pressure of 100 millibar for one hour. Thereafter, the raw garlic bulbs were transferred to a drying chamber of 40° C. temperature with the irradiation of farinfrared rays and were dried such that the water content of bulbs was reduced to 63 % by weight.

In this way, samples of durable odorless garlic were obtained. Upon conducting analysis, the results as shown in Table 1 were obtained to confirm that the malodor was decreased. Further, when the samples were stored for one year under normal temperature, they scarcely showed changes and were found to be germinative.

From 10 to 120 g of ethanol can be added to the deodorizing solution in this example.

The amount of mesoinositol hexaphosphate should be within a range from 4 to 100 g and the amount of silicic acid sol be from 10 to 30 g, both based on 20 kg of water.

Mercaptan in vigorously formed under enzymatic effect at the inside of the raw garlic bulbs warmed by the deodorizing solution of 35° C. Then, as the temperature of solution is lowered, osmosis of the solution into the garlic bulbs is promoted. Silicic acid sol adsorbs sulfides (which generate offensive odors) such as mercaptan formed in the raw garlic bulbs to carry them out of the bulbs and into the solution, while mesoinositol hexaphosphate coagulates protease to suppress the decomposition of alliin (amino acid) which is attributable to the garlic odor. Thus by the synergistic effect of both materials, offensive odors can be removed.

Example 4

A deodorizing solution was prepared by dissolving 30 g of mesoinositol hexaphosphate and 5 g of ethanol in 20 kg of water, and further by adding 500 mg of iodide compound, i.e. potassium iodide in this example. The solution was maintained at 30° C., in which 10 kg of raw garlic bulbs were immersed. After two days, the temperature of solution was lowered to 20° C. and bulbs were further immersed therein for three days. Then, the bulbs were taken out from the solution to be dehydrated in a pressure reduction chamber at a temperature of 30° C. and a pressure of 300 millibar for 2 hours. After the bulbs were taken out from the chamber they were allowed to be spontaneously dried to a water content of 50 % by weight, resulting in samples of durable odorless garlic.

Upon conducting analysis of these samples, the results as shown in Table 1 were obtained to confirm that the malodors were decreased. Further, when the samples were stored at 25° C., they were not rotten even after the lapse of one and half year. Being dipped in water for 2 hours, they became fresh and were found to be germinative.

Putrefaction was prevented because of iodine contained by more than 5 $\gamma$ in the raw garlic bulbs and having a bacteriocidal action. As the iodine compound, calcium iodide, sodium iodide etc. can be used instead of potassium iodide as above. Iodine immersed into the garlic bulbs is kept therein by chemically combining with sulfur, phosphorus and iron, or by reacting with starch. Preferred amount of iodine to be incorporated into the garlic bulbs is from 5 $\gamma$ up to 500 $\gamma$.

TESTS

Using the durable odorless garlic obtained in each of the above examples, the odor test were conducted as described below.

First, each of five persons ate 20 g of nontreated raw garlic bulbs and their exhalations after 10 min and 2 hours were analyzed by gas chromatography to measure the amount of methyl mercaptan, ethyl mercaptan and propyl mercaptan contained therein. Then similar tests were also conducted with respect to the odorless garlic obtained in each of the examples. Table 1 shows average values in each test using five persons. The tests were conducted at intervals of 10 days. As apparent from the table, the mercaptans which are the malodor ingredients in the exhalations were remarkably decreased in accordance with the method of the present invention, as compared with nontreated garlic. It may also be noted that more satisfactory deodorizing effect was obtained by using silicic acid sol together with mesoinositol hexaphosphate.

TABLE 1

| Samples | Time elapsed | Measured value (ppm) | | |
|---|---|---|---|---|
| | | Methyl mercaptan | Ethyl mercaptan | Propyl mercaptan |
| Nontreated | 10 min after | 6.3 | 7.2 | 2.5 |
| | 2 hr after | 5.8 | 6.1 | 1.4 |
| Example 1 | 10 min after | 1.9 | 2.2 | 1.5 |
| | 2 hr after | 1.7 | 1.8 | 0.8 |
| Example 2 | 10 min after | 3.7 | 4.3 | 1.7 |
| | 2 hr after | 3.5 | 3.7 | 0.9 |
| Example 3 | 10 min after | 1.0 | 1.2 | 1.1 |
| | 2 hr after | 0.6 | 1.0 | 0.5 |
| Example 4 | 10 min after | 1.5 | 1.8 | 1.2 |
| | 2 hr after | 1.2 | 1.4 | 0.5 |

As it could be understood from the above description, the present invention has the following advantages:

(1) According to the invention, the raw garlic bulbs with skins are deodorized through immersion in a deodorizing solution and are then dried at a temperature lower than 40° C. to a water content of 50–65 % by weight. The resulting garlic bulbs can be preserved for a long period of time without deteriorating a flavor, nutritive contents and germinability.

(2) Since the water content is reduced by as much as 20 to 30 % as compared with the water content in natural garlic bulbs, the bulb bodies are tightened hard so that spontaneous evaporation of water can be reduced to suppress the surface withering and that they may be tough against damages. Further, they suffer less putrefaction since the propagation of bacteria, if deposited, can be suppressed. Thus, they can withstand the storage for a long period of time with maintaining germinancy.

(3) In case the raw garlic bulbs are immersed in iodine-added deodorizing solution to osmose iodine into the bulbs, since the iodine has a bacteriocidal action, there is an effect of causing less putrefaction and improving the durability for store of the raw garlic bulbs under the normal temperature for a long period of time, without spoiling germinancy.

Although the present invention will be described with reference to its preferred embodiments and examples, many modifications and alterations may be made within the spirit of the invention.

What is claimed is:

1. A method of manufacturing durable odorless garlic comprising the steps of
preparing a deodorizing solution by mixing at least one of mesoinositol hexaphosphate and silicic acid sol with water;
deodorizing raw garlic bulbs by keeping them in said deodorizing solution at a constant temperature over a period of time and then cooling to promote osmosis thereof into the raw garlic bulbs; and
drying the deodorized raw garlic bulbs to the extent that the water content thereof is reduced to a range of from 50 to 65% by weight.

2. A method as claimed in claim 1, wherein said deodorizing solution contains both mesoinositol hexaphosphate and silicic acid sol.

3. A method as claimed in claim 1, further comprising the step of adding an iodide compound to said deodorizing solution prior to the raw garlic bulbs deodorizing step.

4. A method as claimed in claim 1, wherein the raw garlic bulbs are dried to a temperature lower than 40° C.

5. A method as claimed in claim 4, wherein said raw garlic bulbs drying step includes dehydrating the raw garlic bulbs under a reduced pressure.

6. Durable odorless garlic prepared by the steps of:
preparing a deodorizing solution by mixing at least one of mesoinositol hexaphosphate and silicic acid sol with water;
deodorizing raw garlic bulbs by keeping them in said deodorizing solution at a constant temperature over a period of time and then cooling to promote osmosis thereof into the raw garlic bulbs; and
drying the deodorized raw garlic bulbs to the extent that the water content thereof is reduced to a range of from 50 to 65% by weight.

7. Durable odorless garlic as claimed in claim 6 and containing iodine.

8. A method as claimed in claim 1, wherein said constant temperature is between 20° C. and 40° C.

* * * * *